United States Patent
Ye et al.

(10) Patent No.: US 11,802,396 B2
(45) Date of Patent: Oct. 31, 2023

(54) HYBRID FAUCET ASSEMBLY

(71) Applicant: AS America, Inc., Piscataway, NJ (US)

(72) Inventors: Xiaojing Ye, Edison, NJ (US); Walter Pitsch, Washington, NJ (US); Jesus Garcia, Monterrey (MX); Enrique Gonzalez, Garcia (MX)

(73) Assignee: AS America, Inc., Piscataway, NJ (US)

( * ) Notice: Subject to any disclaimer, the term of this patent is extended or adjusted under 35 U.S.C. 154(b) by 0 days.

(21) Appl. No.: 17/704,579

(22) Filed: Mar. 25, 2022

(65) Prior Publication Data

US 2022/0307244 A1    Sep. 29, 2022

Related U.S. Application Data

(60) Provisional application No. 63/166,485, filed on Mar. 26, 2021.

(51) Int. Cl.
*E03C 1/05* (2006.01)
*F16K 11/22* (2006.01)

(52) U.S. Cl.
CPC .............. *E03C 1/055* (2013.01); *F16K 11/22* (2013.01)

(58) Field of Classification Search
CPC .......... E03C 1/055; E03C 1/057; F16K 11/22; F16K 19/006
See application file for complete search history.

(56) References Cited

U.S. PATENT DOCUMENTS

| | | | |
|---|---|---|---|
| 6,390,125 B2 | 5/2002 | Pawelzik et al. | |
| 7,631,372 B2* | 12/2009 | Marty | E03C 1/055 |
| | | | 251/129.01 |
| 7,946,504 B2* | 5/2011 | Shapira | G05D 23/1393 |
| | | | 236/12.12 |
| 8,776,817 B2* | 7/2014 | Sawaski | E03C 1/057 |
| | | | 137/551 |
| 9,714,501 B2 | 7/2017 | Keiter et al. | |
| 9,835,281 B2* | 12/2017 | Pitsch | E03C 1/0403 |
| 9,963,859 B2 | 5/2018 | Mainka et al. | |
| 10,184,232 B2* | 1/2019 | Veros | E03C 1/0404 |
| 10,590,636 B2 | 3/2020 | Schoenbeck et al. | |

FOREIGN PATENT DOCUMENTS

EP          3315674 B1    3/2020

* cited by examiner

*Primary Examiner* — Michael R Reid
(74) *Attorney, Agent, or Firm* — Tyler A. Stevenson; Anna-lisa L. Gallo

(57) ABSTRACT

A hybrid faucet assembly configured to operate in a touchless, hands-free automatic mode and a manual mode comprises a faucet body; a faucet spout; a first manual flow control valve connected to a cold water source; a second manual flow control valve connected to a hot water source; an electromechanical valve connected to a cold water source or to both a cold water source and a hot water source; a flow director; a controller; and an activator device. The hybrid faucet assembly may comprise an override mechanism to disable an automatic mode during operation of a manual mode.

20 Claims, 11 Drawing Sheets

HYBRID FAUCET ASSEMBLY

The disclosure relates generally to faucets. More particularly, the disclosure relates to a hybrid faucet assembly including a touch-free mode and a mechanical manual mode.

BACKGROUND

Faucets have the capability to deliver hot water, cold water, or a hot/cold water mixture from a water source (e.g., tap or well water). Faucets may be mechanically controlled or electronically controlled. A hybrid faucet for residential bathroom use, having an ability to be operated in a touchless "hands-free" mode as well as a traditional manual mode is desired.

SUMMARY

Accordingly, disclosed is a faucet assembly comprising a faucet body; a faucet spout; a first manual flow control valve; a second manual flow control valve; an electromechanical valve; a flow director; a controller; and an activator device, wherein the first manual flow control valve is configured to be fluidly connected to a cold water source and the flow director, and to deliver cold water to the faucet spout, the second flow control valve is configured to be fluidly connected to a hot water source and the flow director, and to deliver hot water to the faucet spout, the electromechanical valve is configured to be fluidly connected to a cold water source and the flow director, the electromechanical valve, the controller, and the activator device are configured to be in electrical communication, and the controller is configured to receive a signal from the activator device indicating it has been activated, and to send a signal to the electromechanical valve to open to deliver cold water to the faucet spout.

A faucet assembly may be configured to be independently operated in a manual mode via operation the first and/or second manual flow control valves, and to be independently operated in an automatic mode via operation of the electromechanical valve.

A faucet assembly may comprise a temperature control assembly comprising a temperature adjuster, wherein the temperature control assembly is configured to be fluidly connected to a cold water source and to a hot water source, the temperature control assembly is fluidly connected to the electromechanical valve, the electromechanical valve is configured to deliver a hot/cold water mixture to the faucet spout, and the temperature adjuster is configured to adjust a ratio of hot water and cold water in the hot/cold water mixture.

BRIEF DESCRIPTION OF THE DRAWINGS

The disclosure is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

DETAILED DESCRIPTION

Figure 1:
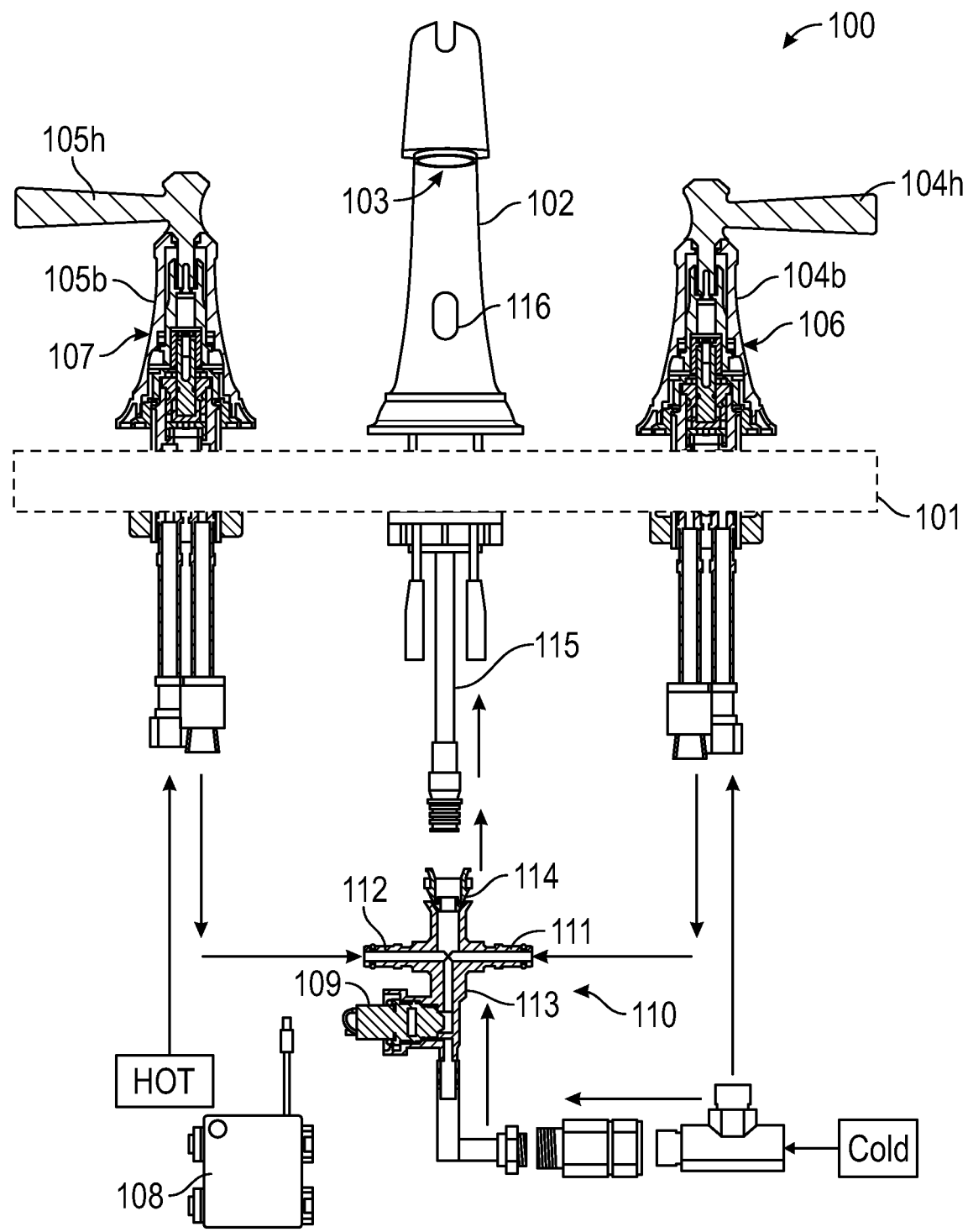
FIG. 1 shows a schematic diagram of a faucet assembly, according to some embodiments.

FIG. 1 shows faucet assembly 100, according to some embodiments. As illustrated in FIG. 1, the faucet assembly 100 may be installed on a surface or deck 101. Deck 101 may be, for example, a vanity surface or other countertop surface. In some embodiments, faucet assembly 100 may be installed on deck 101 in a bathroom, a kitchen, a laundry room, or the like. When installed, faucet assembly 100 includes several features that are disposed above deck 101. Faucet assembly 100 includes faucet body 102. Faucet body 102 includes faucet spout 103. Faucet spout 103 provides an outlet via which water is delivered by faucet assembly 100.

Faucet assembly 100 includes first handle 104$h$ and second handle 105$h$. First handle 104$h$ is a cold water handle for turning on/off cold water and second handle 105$h$ is a hot water handle for turning on/off hot water. First handle 104$h$ is positioned on first handle body 104$b$. First manual flow control valve 106 is positioned within first handle body 104$b$. Second handle 105$h$ is positioned on second handle body 105$b$. Second manual flow control valve 107 is disposed within second handle body 105$b$.

First manual flow control valve 106 may be connected to a cold water source and second manual flow control valve 107 may be connected to a hot water source. In some embodiments, first manual flow control valve 106 and second manual flow control valve 107 include an opened state and a closed state. In some embodiments, an opened state may include a fully opened state and a partially opened state (alternatively an intermediate state). For example, an opened state may include any degree of opening of first manual flow control valve 106 or second manual flow control valve 107 that would allow water to flow therethrough. A closed state prevents water from flowing therethrough. First manual flow control valve 106 and second manual flow control valve 107 may be adjusted (via the first handle 104$h$ and the second handle 105$h$, respectively) so that a flow rate of the water is adjusted. In addition to adjusting a flow rate of water, a relative opening of first manual flow control valve 106 and second manual flow control valve 107 may in turn determine a temperature of water dispensed based on a mixing of water from a cold water source and a hot water source.

In some embodiments, faucet assembly 100 may be referred to as a spread, or wide-spread faucet assembly as faucet body 102, first handle body 104$b$, and second handle body 105$b$ are separate bodies spaced apart from each other when installed on deck 101.

Faucet assembly 100 includes several features disposed below deck 101. Faucet assembly 100 includes controller 108. In some embodiments, controller 108 may include a detection circuit (not shown) where a microcomputer (not shown), programs (not shown), and the like are embedded.

When a signal according to operation is transmitted to a detection circuit (not shown), a signal processed at the detection circuit (not shown) is output to electrically open and close electromechanical flow control valve 109, for example a solenoid valve. In some embodiments, controller 108 may be electrically connected to a power source such as, but not limited to, a battery. In some embodiments, a power source may be hardwired to an electrical system of the building in which faucet assembly 100 is installed. As such, a power source may alternatively be an alternating current (AC) power source. In some embodiments, controller 108 may be in wired or wireless communication with electromechanical valve 109.

Electromechanical valve 109 includes an opened state and a closed state. In some embodiments, electromechanical flow control valve 109 may include a partially opened state. In some embodiments, electromechanical valve 109 may be an electromechanical flow control valve. Electromechanical valve 109 may be selectively placed in an opened or closed state based on a signal or instruction from controller 108. In some embodiments, electromechanical valve 109 may be a magnetic electromechanical valve. It is to be appreciated that other electronic valves capable of being electronically actuated to control a state of the flow therethrough are possible. In some embodiments, electromechanical valve 109 may be designed such that a flowrate of water is provided when valve 109 is preset. In some embodiments, electromechanical valve 109 may be designed to include a partially opened state that varies so that a flowrate of water may be controlled. It is to be appreciated that a flowrate of water is also dependent on factors such as, but not limited to, water pressure at a location of the installation of faucet assembly 100.

In some embodiments, faucet assembly 100 includes flow director 110. Flow director 110 includes flow inlets 111, 112, and 113, and flow outlet 114. Flow inlet 111 is fluidly connected to manual flow control valve 106. Flow inlet 112 is fluidly connected to manual flow control valve 107. Flow inlet 113 is fluidly connected to a cold water source. Electromechanical flow control valve 109 is fluidly connected to a cold water source and flow inlet 113.

Fluid line 115 is fluidly connected to flow outlet 114 and faucet spout 103. Faucet assembly 100 is configured to provide water from a cold water source, a hot water source, or a mixture thereof, via the flow outlet 114, fluid line 115, and faucet spout 103. In some embodiments, fluid line 115 may be a flexible conduit that may extend through faucet body 102 to faucet spout 103.

In some embodiments, faucet assembly 100 includes activator device 116 in electrical communication with electromechanical valve 109 and controller 108. In some embodiments, activator device 116 is configured to control valve 109 between an opened state and a closed state (or a partially opened state) via a detection circuit in controller 108. In some embodiments, activator device 116 may be positioned on or in faucet body 102. In some embodiments, activator device 116 may be positioned on or in first handle body 104b, on or in second handle body 105b, or a combination thereof. In some embodiments, activator device 116 may communicate via a wired communication or a wireless communication with controller 108.

In some embodiments, activator device 116 includes a sensor. In some embodiments, activator device 116 includes a sensor configured to detect motion, presence of an object, absence of an object, sound, temperature changes, light, electromagnetic fields, alterations in reflected energy, or any combination thereof. In some embodiments, activator device 116 includes an active infrared sensor, a capacitance detection sensor, an optical detection sensor, a thermal detection sensor, or any combination thereof. In some embodiments, activator device 116 may include a plurality of sensors. In some embodiments, activator device 116 may include a microphone. In some embodiments, a microphone may enable a voice-control of an automatic faucet mode. In some embodiments, in response to sensing a signal via activator device 116, a state of electromechanical flow control valve 109 may be modified.

When first manual flow control valve 106 is in an opened state, faucet assembly 100 delivers water from a cold water source to first manual flow control valve 106, the first flow inlet 111, flow outlet 114, fluid line 115, and faucet spout 103. When second manual flow control valve 107 is in an opened state, faucet assembly 100 delivers water from a hot water source to second manual flow control valve 107, second flow inlet 112, flow outlet 114, fluid line 115, and faucet spout 103. When electromechanical valve 109 is in an opened state, faucet assembly 100 is configured to deliver water from a cold water source to third flow inlet 113, flow outlet 114, fluid line 115, and faucet spout 103.

In some embodiments, faucet assembly 100 may include multiple modes of operation. In a first automatic mode, first handle 104h and second handle 105h may be in an off position in which first manual flow control valve 106 and second manual flow control valve 107 are closed. In a first automatic mode, activator device 116 may control a water output of faucet spout 103. For example, in some embodiments, in response to detecting an indication of intended use of faucet assembly 100, activator device 116 may enable flow from faucet spout 103. As such, a first automatic mode may be referred to as a hands-free mode. In the illustrated embodiment of FIG. 1, a first automatic mode includes only cold water. Activator device 116 may detect intended use when a person places a hand or object near or in front of it.

In a second manual mode, first handle 104h, second handle 105h, or combination thereof may be moved to an on position via rotation. In an on position, first manual flow control valve 106 or second manual flow control valve 107 may be opened to enable flow of water from faucet spout 103. A second manual mode may be referred to as a standard mode, manual mode, mechanical mode, or the like. In a second manual mode, fluid flow may include hot water, cold water, or hot/cold water mixture. In some embodiments, when entering a second manual mode, activator device 116 and a first automatic mode may be disabled.

Figure 2:
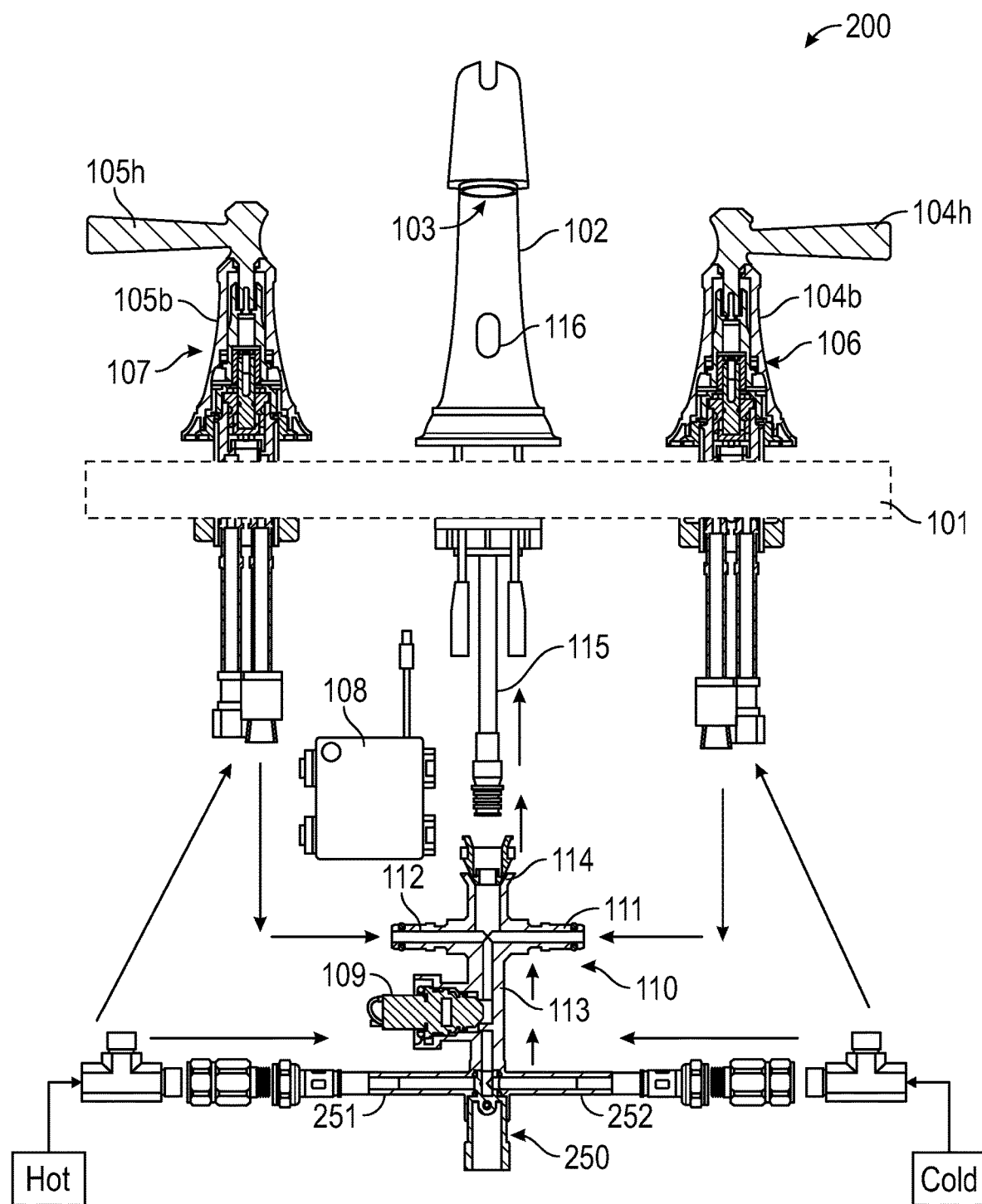
FIG. 2 provides a schematic diagram of a faucet assembly, according to some embodiments.

FIG. 2 provides a cross-section view of a faucet assembly 200, according to some embodiments. In this embodiment, a hot water source is connected to flow director 110 via flow inlet 112 and a cold water source is connected to flow director 110 via flow inlet 111. In a manual mode, operation of first manual flow control valve 106 and/or second manual flow control valve 107 is configured to supply water through flow director 110 to fluid line 115, and to spout 103. In an automatic mode, upon activator device 116 detecting an intended use, controller 108 will instruct electromechanical valve 109 to open to deliver water through inlet 252 and or inlet 251 to fluid line 115, and to spout 103. In this embodiment, an automatic mode is configured to deliver cold water, hot water, or a hot/cold water mixture. Temperature control assembly 250 is configured to control a temperature of water delivered from faucet spout 103. In some embodiments, temperature control assembly 250 may include a flow mixer that mixes water from a hot water source and a cold water source to achieve a desired temperature. In some embodiments, temperature control assembly 250 is adjustable to control a temperature of water from delivered from faucet spout 103 according to a user setting. In some embodiments, an initial setting of temperature control assembly 250 may be completed at a time of manufacturing. As such, in operation of a first automatic mode (i.e., hands-free mode), water output from faucet spout 103 may include a mixture of hot water and cold water. Thus, modes of operation of faucet assembly 200 are different than modes of operation of faucet assembly 100 of FIG. 1, in that a first automatic mode for faucet assembly 200 may include mixed hot and cold water instead of cold water only. Depending on settings of temperature control assembly 250, a first automatic mode for faucet assembly 200 may include cold water, cold water mixed with hot water, or hot water. Temperature control assembly 250 is positioned upstream of electromechanical valve 109.

FIG. 3A through FIG. 3L provide schematic diagrams illustrating various settings for temperature control assembly 250 of faucet assembly 200, according to some embodiments. Temperature control assembly 250 is shown in four discrete states. It is to be appreciated that settings may be modified beyond the four states shown (e.g., intermediate positioning).

Figure 3A:
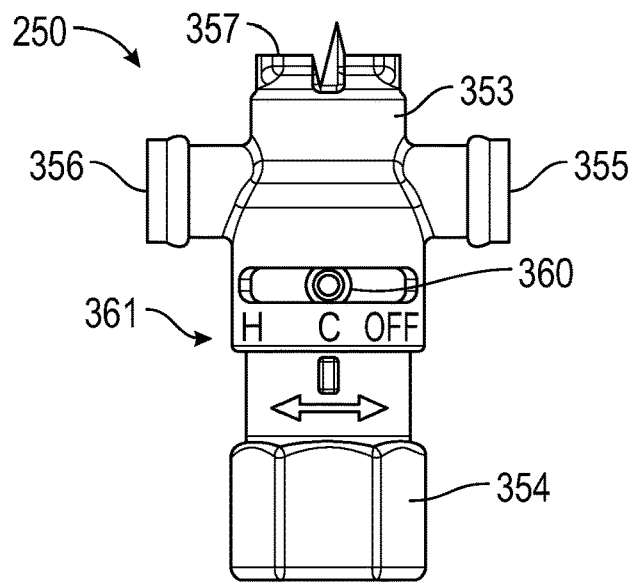
FIG. 3A through FIG. 3L provide schematic diagrams illustrating various settings for a temperature control assembly, according to some embodiments.
Figure 3B:
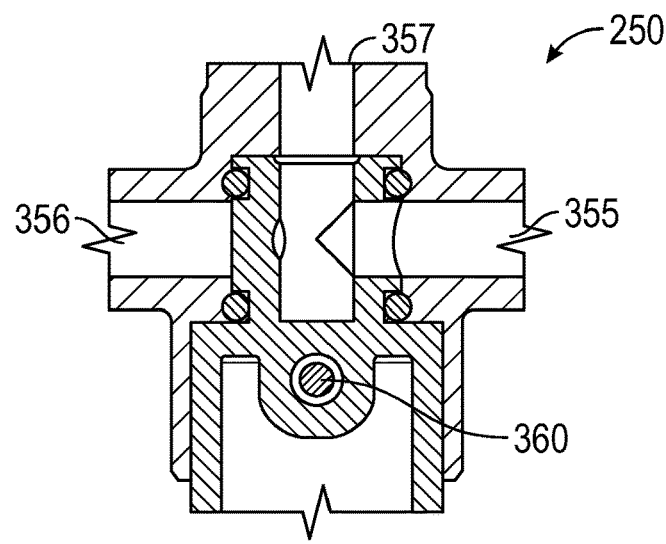
Figure 3C:
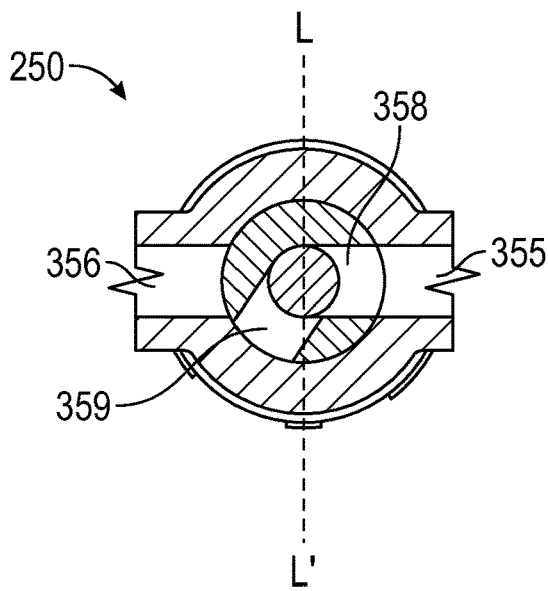
Figure 3D:
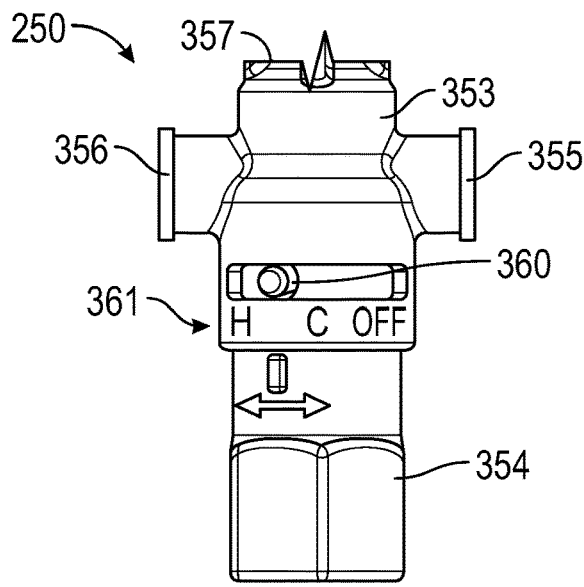
Figure 3E:
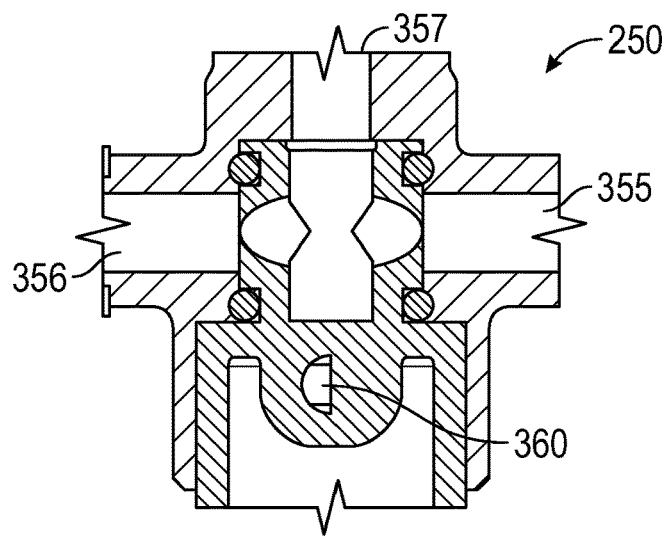
Figure 3F:
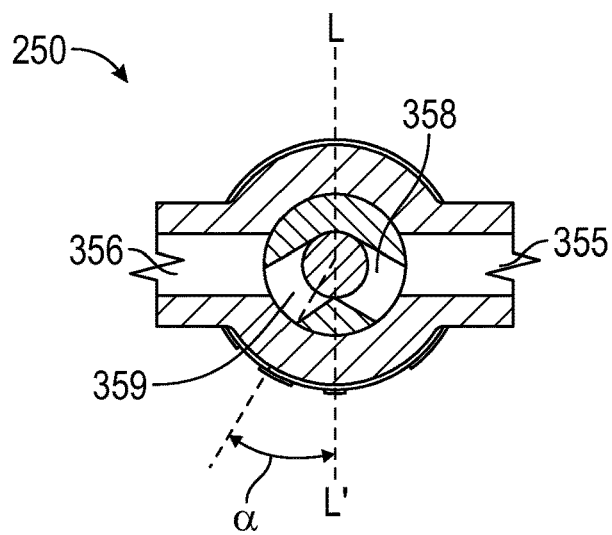
Figure 3G:
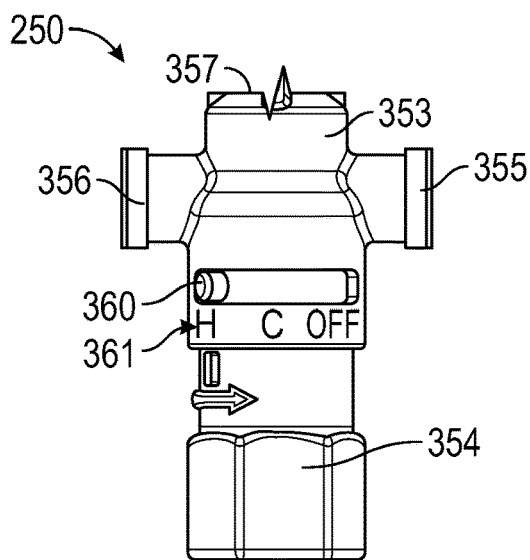
Figure 3H:
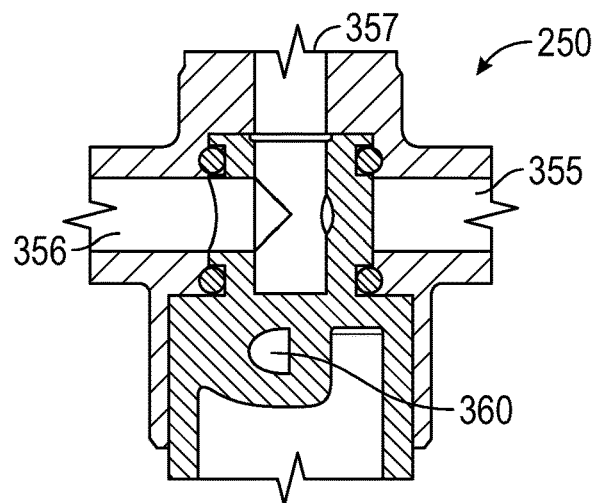
Figure 3I:
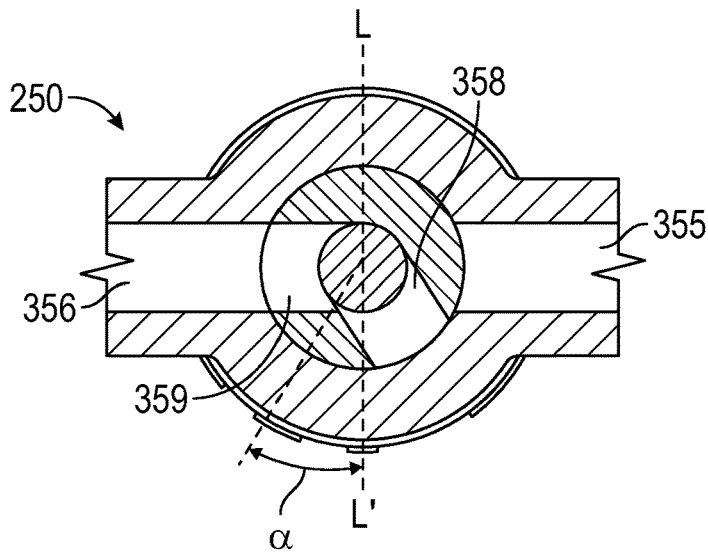
Figure 3J:
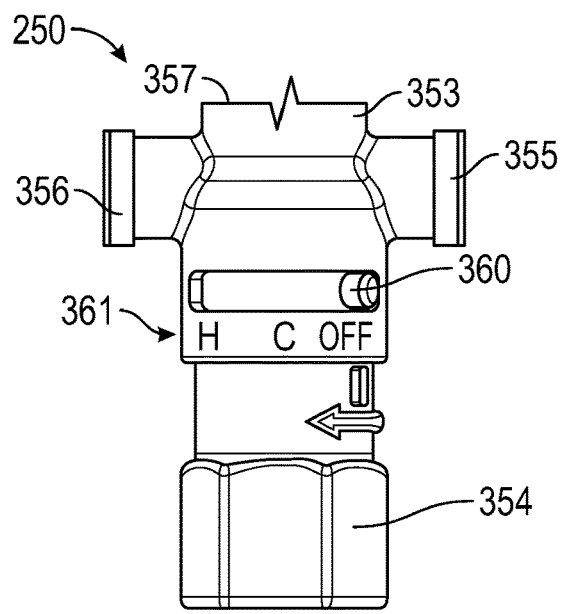
Figure 3K:
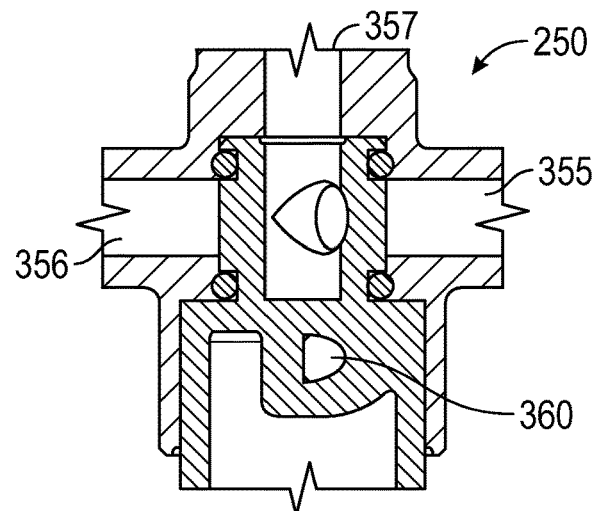
Figure 3L:
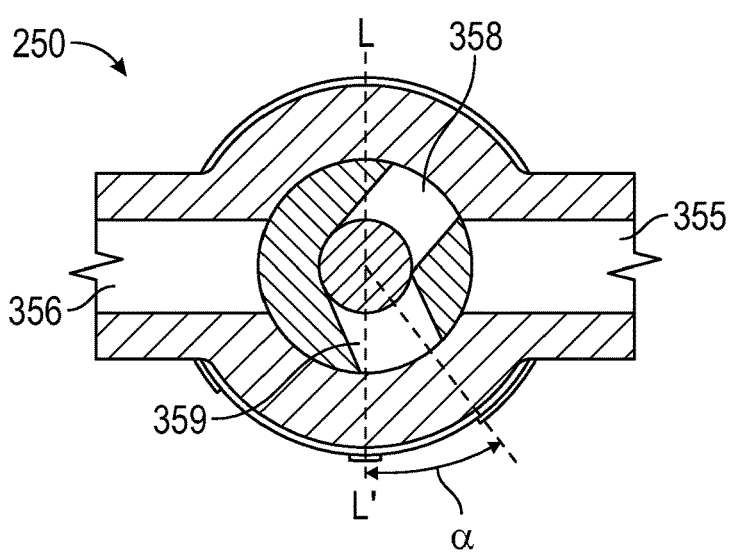

In FIG. 3A, FIG. 3B, and FIG. 3C, temperature control assembly 250 is set to provide cold water (e.g., a first state). In FIG. 3D, FIG. 3E, and FIG. 3F, temperature control assembly 250 is set to provide mixed hot and cold water (e.g., a second state). In FIG. 3G, FIG. 3H, and FIG. 3I, temperature control assembly 250 is set to provide hot water (e.g., a third state). In FIG. 3J, FIG. 3K, and FIG. 3L, temperature control assembly 250 is set to prevent flow (e.g., a fourth state). Each set of FIGS. 3A-3C, 3D-3F, 3G-3I, 3J-3L) includes a side view, a side sectional view, and a top view of temperature control assembly 250. Temperature control assembly 250 includes indicator 360, labels 361, fixed body 353, and temperature adjuster (rotatable knob) 354. Temperature control assembly 250 also includes cold water inlet 355, hot water inlet 356, and outlet 357. To control the temperature of water output from outlet 357, temperature adjuster 354 may be rotated about its longitudinal axis. The rotation controls an amount of water from cold water inlet 355 and hot water inlet 356 provided to outlet 357. As a result, a temperature of water provided to and from faucet spout 103 may be controlled by a user.

Referring to FIGS. 3A-3C, temperature adjuster (rotatable knob) 354 is in an un-rotated position. In an un-rotated position (an angle α with respect to line L-L' is 0°, flow is enabled from cold water inlet 355 to outlet 357 and flow is prevented from hot water inlet 356 to outlet 357. Line L-L' is perpendicular to cold water inlet 355 and hot water inlet 356. Outlet 357 would be out of the page in FIG. 3C. This is visible because passageway 358 aligns with cold water inlet 355 and passageway 359 does not align with hot water inlet 356.

Referring to FIGS. 3D-3F, the temperature adjuster 354 is in a partially rotated position. In a partially rotated position (the angle α with respect to line L-L' is between about −55° and 0°, flow is enabled from cold water inlet 355 and hot water inlet 356 to outlet 357. An amount of rotation controls an amount of hot water or cold water in the mixture, and thus, an outlet temperature of water. Line L-L' is perpendicular to cold water inlet 355 and hot water inlet 356. Outlet 357 would be out of the page in FIG. 3F. It is to be appreciated that values for angle α are examples and may vary beyond the stated values. This is visible because passageway 358 partially aligns with cold water inlet 355 and passageway 359 partially aligns with hot water inlet 356.

Referring to FIGS. 3G-3I, temperature adjuster 354 is in a fully rotated position. In a fully rotated position (the angle α with respect to line L-L' is about −55°, flow is enabled from hot water inlet 356 to outlet 357 and prevented from cold water inlet 355 to outlet 357. An amount of rotation controls an amount of hot water and cold water in the mixture, and thus, an outlet temperature of water. Line L-L' is perpendicular to cold water inlet 355 and hot water inlet 356. Outlet 357 would be out of the page in FIG. 3I. It is to be appreciated that values for angle α are examples and may vary beyond the stated values. This is visible because passageway 358 does not align with cold water inlet 355 and passageway 359 aligns with hot water inlet 356.

Referring to FIGS. 3J-3L, temperature adjuster 354 is in an off position. In an off position (angle α with respect to line L-L' is about 55°, flow is prevented from cold water inlet 355 and hot water inlet 356 to outlet 357. An off position may be used when a user wants to disable an automatic mode of faucet assembly 200. For example, if a user wants to clean without faucet assembly 200 turning on automatically, a user may set temperature control assembly 250 to an off position. It is to be appreciated that other uses besides cleaning are contemplated and within the scope of this disclosure. Line L-L' is perpendicular to cold water inlet 355 and hot water inlet 356. Outlet 357 would be out of the page in FIG. 3L. It is to be appreciated that values for angle α are examples and may vary beyond the stated values. This is visible because passageway 358 does not align with cold water inlet 355 and passageway 359 does not align with hot water inlet 356.

A temperature adjuster of a temperature of a temperature control assembly may comprise a knob as shown in the above embodiments. In other embodiments, a temperature adjuster may comprise a lever, a rotatable dial, and the like.

Figure 4A:
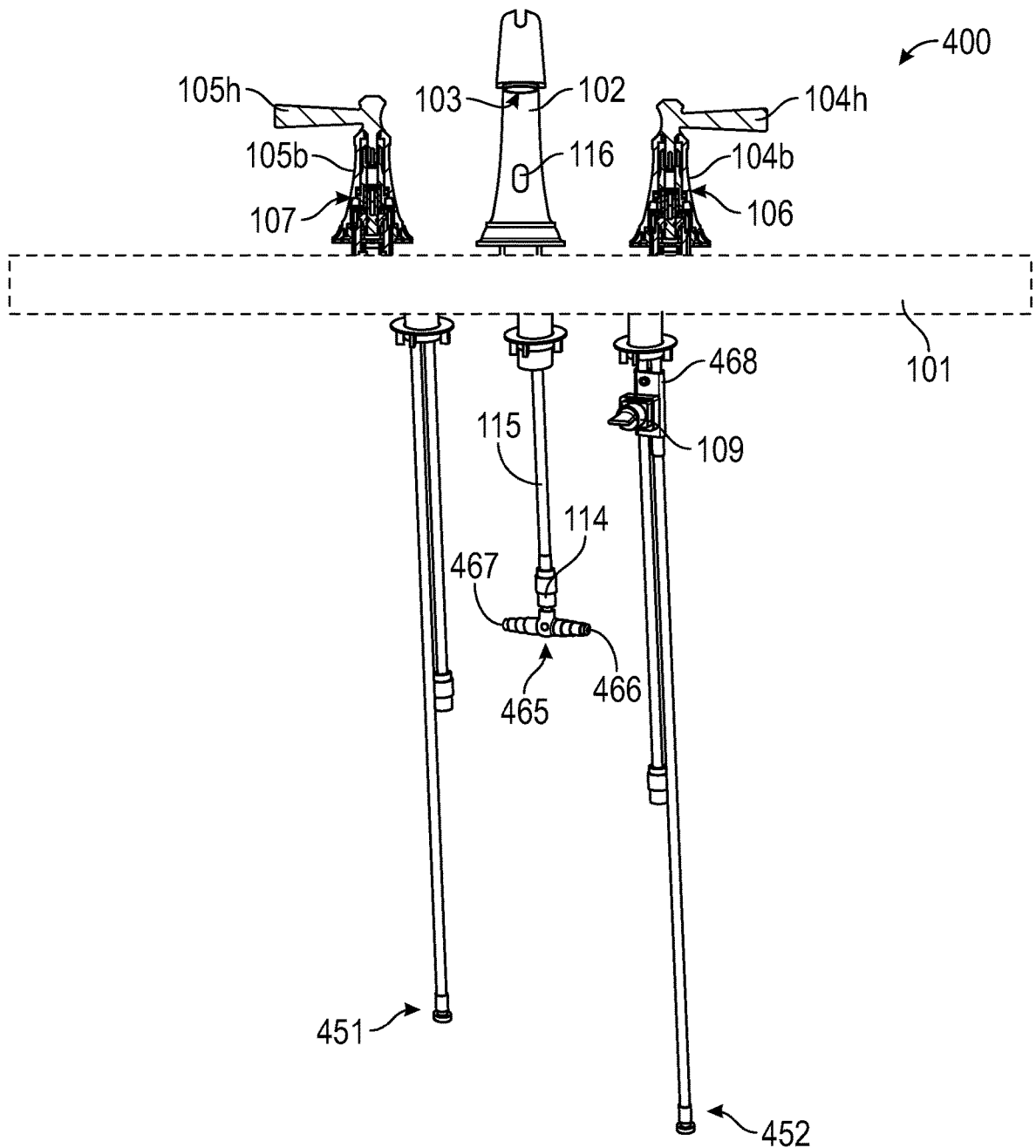
FIG. 4A is a schematic diagram of a faucet assembly, according to some embodiments.

FIG. 4A provides a schematic diagram of a faucet assembly 400, according to some embodiments. In faucet assembly 400, a location of electromechanical flow control valve 109 has been moved and flow director 465 includes first and second flow inlets 466 and 467. Faucet assembly 400 includes manifold 468 configured to control flow from a cold water source depending on whether an automatic mode or a manual mode is utilized. Manifold 468 is shown and described in additional detail in FIG. 4B. Shown are hot water inlet 451 and cold water inlet 452.

In some embodiments, faucet assembly 400 may include multiple modes of operation. In a first automatic mode, first handle 104h and second handle 105h may be in an off position in which first manual flow control valve 106 and second manual flow control valve 107 are closed to prevent water from flowing out of faucet spout 103. In a first automatic mode, activator device 116 may control an output of faucet spout 103. For example, in some embodiments, in response to detecting an indication of intended use of faucet assembly 400, activator device 116 may enable flow from faucet spout 103. As such, a first automatic mode may be referred to as a hands-free mode. In the illustrated embodiment, a first automatic mode includes only cold water. In a second manual mode, first handle 104h, second handle 105h, or a combination thereof may be moved to an on position via rotation. In an on position first manual flow control valve 106 or second manual flow control valve 107 may be opened to enable flow of water from faucet spout 103. A second manual mode may be referred to as a standard mode, manual mode, mechanical mode, or the like. In a second manual mode, fluid flow may include hot water, cold water, or a mixture thereof.

Figure 4B:
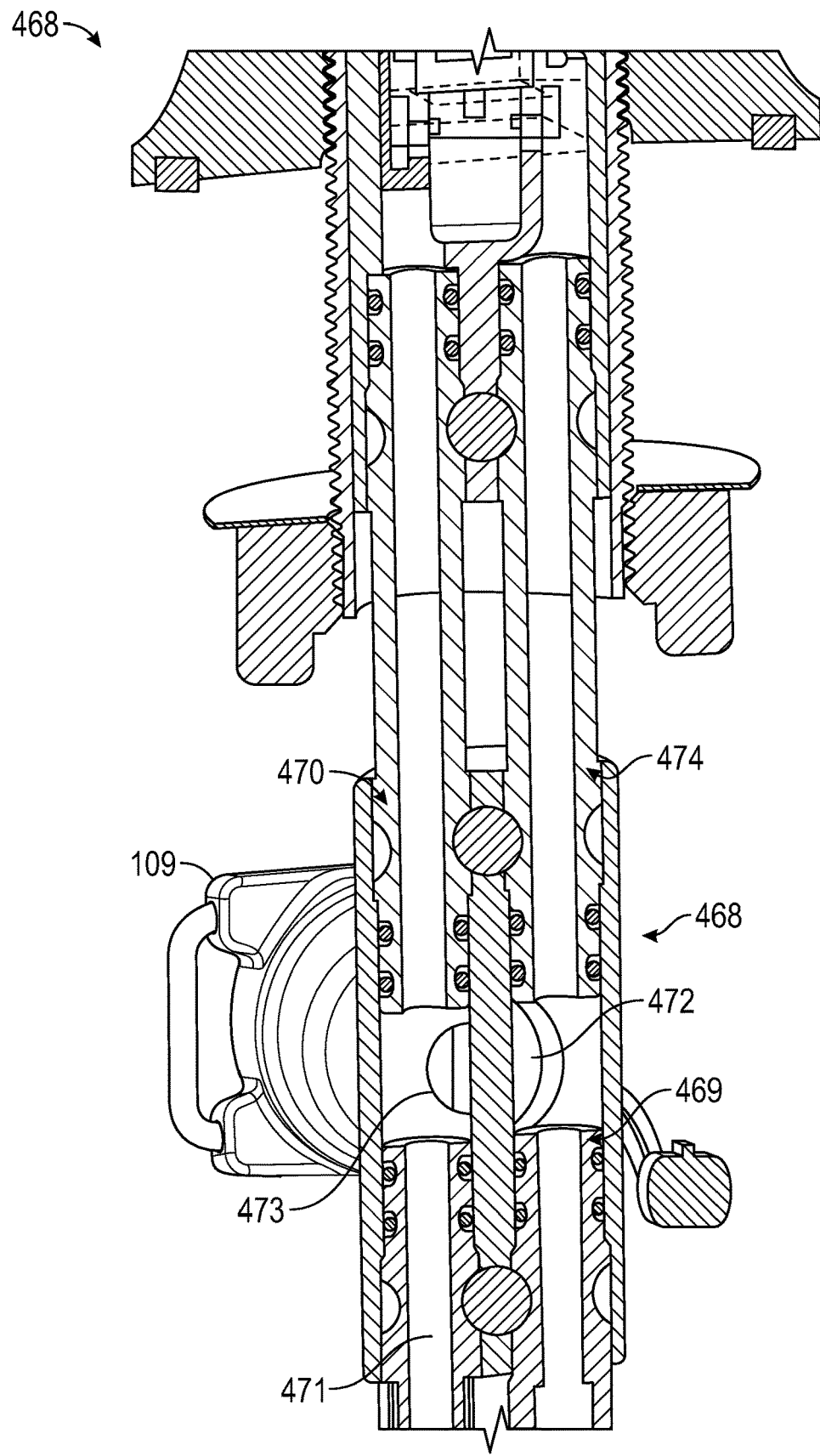
FIG. 4B is a schematic diagram of a manifold of a faucet assembly of FIG. 4A, according to some embodiments.

FIG. 4B provides a sectional view of manifold 468 of faucet assembly 400, according to some embodiments. Manifold 468 may be configured to distribute flow of cold water from a cold water source according to a state of electromechanical valve 109. Manifold 468 includes a first fluid flow inlet 469 and a second fluid flow inlet 470. First fluid flow inlet 469 is configured to receive cold water from a cold water source. Second fluid flow inlet 470 is fluidly connected to manual flow control valve 106 and is configured to receive cold water from a cold water source via manual flow control valve 106 when valve 106 is in an opened state. Manifold 468 includes fluid flow outlet 471 to direct cold water from a cold water source (in either an automatic mode or a manual mode) to flow director 465. To selectively control fluid flow in an automatic mode, manifold 468 includes fluid flow inlet 472 and fluid flow outlet 473. In the illustrated embodiment, fluid flow inlet 472 may allow cold water from a cold water source to flow from fluid flow inlet 472 to fluid flow outlet 473 (i.e., flow into the page and then out of the page). Fluid flow inlet 472 and fluid flow outlet 473 may accordingly be an inlet and outlet end of a flow channel that may be selectively enabled or disabled based on an opened or closed state of electromechanical flow control valve 109. Thus, in an automatic mode, fluid flow may be from a cold water source to fluid flow inlet 469, to fluid flow inlet 472, from fluid flow outlet 473, from fluid flow outlet 471, to flow director 465, to fluid line 115, and out faucet spout 103. In a manual mode, fluid may flow from a cold water source to fluid flow inlet 469, to fluid flow outlet 474, through manual flow control valve 106, to fluid flow inlet 470, to fluid flow outlet 471, to flow director 465, to fluid line 115, and out faucet spout 103.

Figure 5:
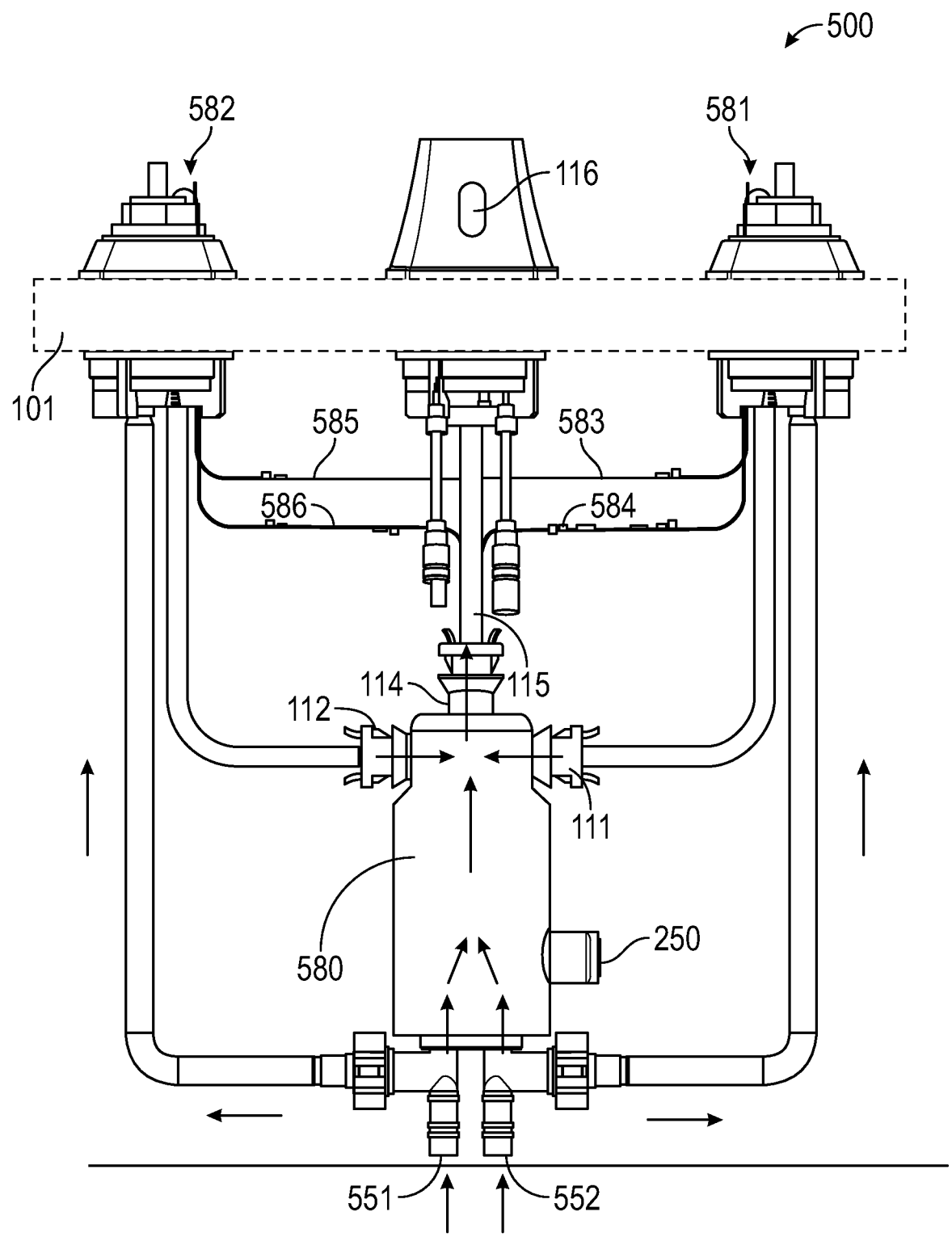
FIG. 5 is a schematic diagram of a faucet assembly, according to some embodiments.

FIG. 5 provides a schematic diagram of faucet assembly 500, according to some embodiments. In some embodiments, faucet assembly 500 may include housing 580. In some embodiments, a controller 108, electromechanical flow control valve 109, flow director 110, and temperature control assembly 250 may all be disposed within housing 580 (and therefore not visible). In some embodiments, this may simplify installation of faucet assembly 500 as these multiple features are contained within housing 580.

In some embodiments, faucet assembly 500 includes an override assembly comprising cold water switch 581 and hot water switch 582. Cold water switch 581 and hot water switch 582 may be electrically connected to controller 108. In operation, cold water switch 581 and hot water switch 582 may serve to disable a first automatic mode of operation of faucet assembly 500 when one or both of a first handle 104h (not shown) or a second handle 105h (not shown) are turned to an on position. In some embodiments, this switching may disable a first automatic mode of operation so that water flow and temperature is set according to the user's configuration of a first handle 104h and/or a second handle 105h. For example, rotation of either a first handle 104h or a second handle 105h may disrupt continuity of a detection circuit. In some embodiments, this may increase a lifetime of an electromechanical flow control valve 109 as it is prevented from unnecessary opening/closing cycles.

Cold water switch 581 includes wires 583 and 584 connected to a power source, activator device 116, controller 108, and electromechanical flow control valve 109. Similarly, hot water switch 582 includes wires 585 and 586 connected to power source, activator device 116, controller 108, and electromechanical flow control valve 109. Cold water switch 581 and hot water switch 582, through the wires 583, 584, 585, 586 may be connected in series with a power source, activator device 116, controller 108, and electromechanical flow control valve 109. As such, when either first handle 104h or second handle 105h is turned and a corresponding cold water switch 581 or hot water switch 582 is opened, electromechanical flow control valve 109 and activator device 116 may be disabled. In some embodiments, when electromechanical flow control valve 109 and activator device 116 are disabled, electromechanical flow control valve 109 may be set to the closed state. Also shown are hot water inlet 551 and cold water inlet 552. In some embodiments, controller 108 may be configured to disable an automatic mode upon rotating a manual handle to open or close a switch. In other embodiments, simply opening or closing a switch may break a circuit to disable an automatic mode without any instructions from a controller. Upon restoring a manual handle or handles to a closed position, an automatic mode may be re-enabled.

Figure 6A:
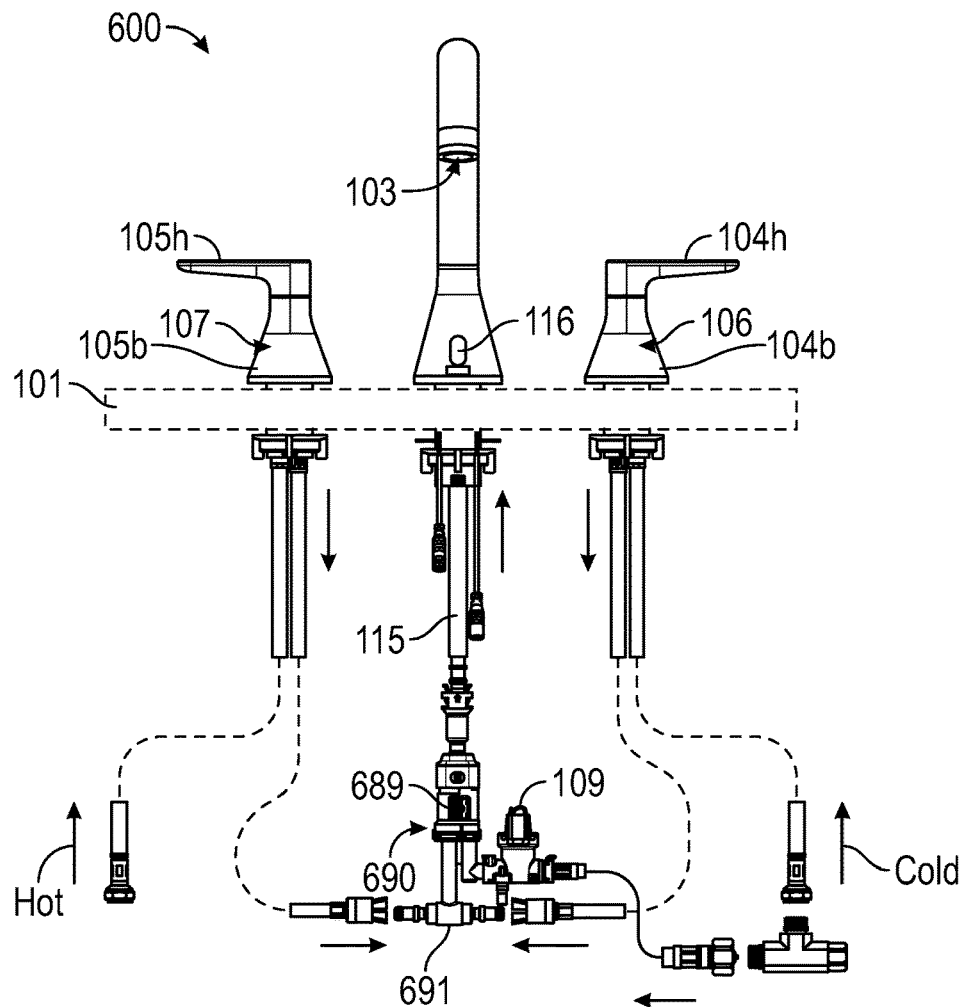
FIG. 6A and FIG. 6B show views of a faucet assembly, according to some embodiments.
Figure 6B:
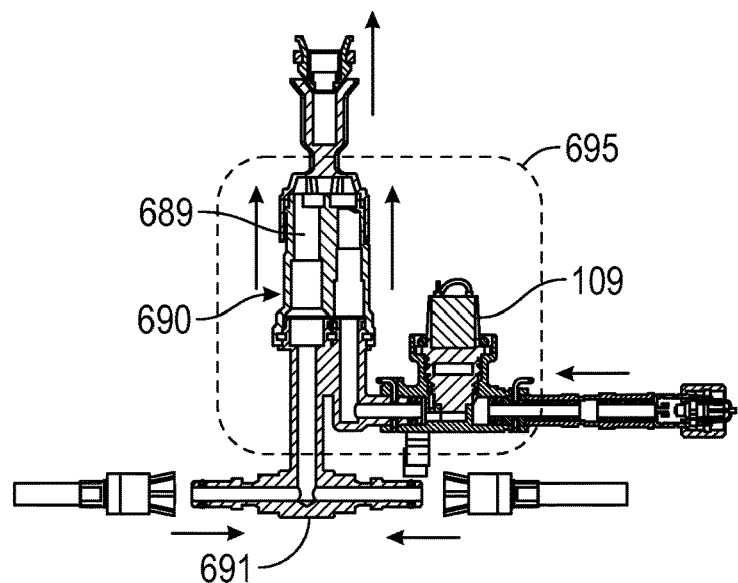

FIG. 6A provides a view of faucet assembly 600, according to some embodiments. Assembly 600 is similar to assembly 100, and further comprises an override assembly comprising flow sensor 689 positioned in manifold 690. In this embodiment, when a person activates an automatic mode to deliver water via activator device 116, for instance an IR sensor, electromechanical valve (for example solenoid valve) 109 opens to deliver cold water from a cold water source, through valve 109, through manifold 690, through fluid line 115, and out spout 103. Upon turning handle 104h and/or 105h to deliver water in a manual or mechanical mode, water will flow from manual valves 106 and/or 107 in handle bodies 104b and 105b to deliver water through flow director 691, and through manifold 690, where water flow is detected by flow sensor 689. Assembly 600 is configured such that, when flow sensor 689 detects water flow, an automatic mode is disabled and water may not flow through electromechanical valve 109. FIG. 6B provides an expanded cross-section view of manifold 690 and valve 109, which may be positioned in housing 695. Flow sensor 689, electromechanical valve 109, and activator device 116 may be in electrical communication with a power source and a controller. Flow director 691 and electromechanical valve 109 are fluidly coupled to manifold 690 and are positioned upstream of manifold 690. Temperature control assembly 250 is positioned upstream of electromechanical valve 109.

Figure 7A:
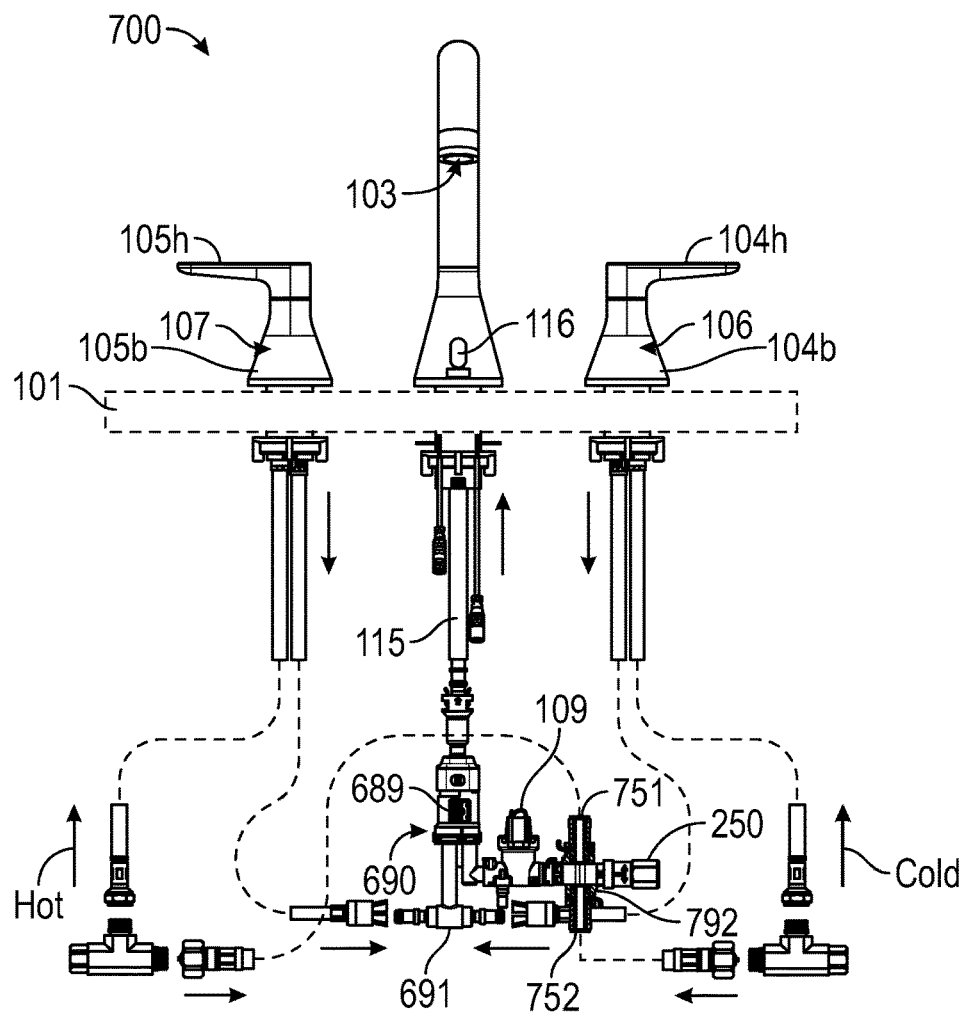
FIG. 7A and FIG. 7B show views of a faucet assembly, according to some embodiments.
Figure 7B:
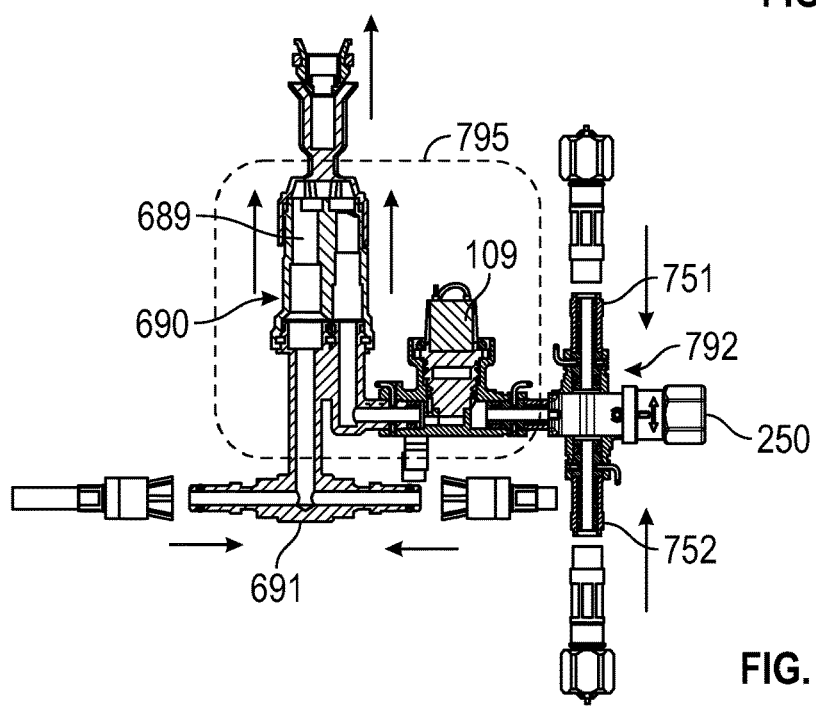

FIG. 7A provides a view of faucet assembly 700, according to some embodiments. Assembly 700 is similar to assembly 200, and further comprises flow sensor 689 positioned in manifold 690. In this embodiment, when one activates an automatic mode to deliver water via activator device 116 (for instance an IR sensor), electromechanical valve (for example solenoid valve) 109, opens to deliver a hot/cold water mixture from hot and cold water sources through hot water inlet 751 and cold water inlet 752 of flow director 792, through valve 109, through manifold 690, through fluid line 115, and out spout 103. Upon turning handle 104h and/or 105h to deliver water in a manual or mechanical mode, water will flow from manual valves 106 and/or 107 in handle bodies 104b and 105b to deliver water through flow director 691, and through manifold 690, where water flow is detected by flow sensor 689. Assembly 700 is configured such that, when flow sensor 689 detects water flow, an automatic mode is disabled and water may not flow through electromechanical valve 109. FIG. 7B provides an expanded cross-section view of manifold 690 and valve 109, which may be positioned in housing 795. Flow sensor 689, electromechanical valve 109, and activator device 116 may be in electrical communication with a power source and a controller. Temperature of mixed hot/cold water may be adjusted with temperature control assembly 250.

In some embodiments, a faucet assembly is disclosed. In some embodiments, a faucet assembly includes a faucet body and a faucet spout. In some embodiments, a faucet assembly includes a first manual flow control valve that includes an opened state and a closed state. In some embodiments, a first manual flow control valve is configured to be fluidly connected to a cold water source. In some embodiments, a faucet assembly includes a second manual flow control valve having an opened state and a closed state. In some embodiments, a second manual flow control valve is configured to be fluidly connected to a hot water source. In some embodiments, a faucet assembly includes an electromechanical flow control valve having an opened state and a closed state. In some embodiments, a faucet assembly includes a flow director that includes a plurality of flow inlets and a flow outlet. In some embodiments, a first of a plurality of flow inlets is configured to be fluidly connected to a first manual flow control valve. In some embodiments, a second of a plurality of flow inlets is configured to be fluidly connected to a second manual flow control valve. In some embodiments, a third of a plurality of flow inlets is configured to be fluidly connected to a cold water source. In some embodiments, an electromechanical flow control valve is configured to be fluidly connected to a cold water source and the third of a plurality of flow inlets. In some embodiments, a faucet assembly includes a fluid line configured to be fluidly connected to a flow outlet and a faucet spout. In some embodiments, a faucet assembly includes an activator device configured to be in electrical communication with a controller. In some embodiments, a controller is configured to be in electrical communication with an electromechanical flow control valve. In some embodiments, an activator device is configured to control an electromechanical flow control valve between an opened state and a closed state. In some embodiments, when a first manual flow control valve is in an opened state, a faucet assembly is configured to deliver water from a cold water source to a first manual flow control valve, a first of a plurality of flow inlets, a flow outlet, a fluid line, and a faucet spout. In some embodiments, when a second manual flow control valve is in an opened state, a faucet assembly is configured to deliver water from a hot water source to a second manual flow control valve, a second of a plurality of flow inlets, a flow outlet, a fluid line, and a faucet spout. In some embodiments, when an electromechanical flow control valve is in an opened state, a faucet assembly is configured to deliver water from a cold water source to a third of a plurality of flow inlets, a flow outlet, a fluid line, and a faucet spout.

In some embodiments, an assembly includes an electromechanical flow control valve. In some embodiments, an electromechanical flow control valve has an opened state and a closed state. In some embodiments, a flow director includes a plurality of flow inlets and a flow outlet. In some embodiments, a first of a plurality of flow inlets is configured to be fluidly connected to a first manual flow control valve. In some embodiments, a second of a plurality of flow inlets is configured to be fluidly connected to a second manual flow control valve. In some embodiments, a third of a plurality of flow inlets is configured to be fluidly connected to a cold water source. In some embodiments, an electromechanical flow control valve is configured to be fluidly connected to a cold water source and to a third of a plurality of flow inlets. In some embodiments, an electromechanical flow control valve is configured to be controlled between an opened state and a closed state. In some embodiments, when a first manual flow control valve is in an opened state, an assembly is configured to deliver water from a cold water source to a first manual flow control valve, a first of a plurality of flow inlets, and a flow outlet. In some embodiments, when a second manual flow control valve is in an opened state, an assembly is configured to deliver water from a hot water source to a second manual flow control valve, a second of a plurality of flow inlets, and a flow outlet. In some embodiments, when an electromechanical flow control valve is in an opened state, an assembly is configured to deliver water from the cold water source to a third of a plurality of flow inlets, and a flow outlet.

In some embodiments, a faucet assembly includes a faucet body having a faucet spout. In some embodiments, a first manual flow control valve has an opened state and a closed state. In some embodiments, a first manual flow control valve is configured to be fluidly connected to a cold water source. In some embodiments, a second manual flow control valve has an opened state and a closed state.

In some embodiments, a second manual flow control valve is configured to be fluidly connected to a hot water source. In some embodiments, an electromechanical flow control valve has an opened state and a closed state. In some embodiments, a flow director includes a plurality of flow inlets and a flow outlet. In some embodiments, a first of a plurality of flow inlets is configured to be fluidly connected to a first manual flow control valve and to an electromechanical flow control valve. In some embodiments, a second of a plurality of flow inlets is configured to be fluidly connected to a second manual flow control valve. In some embodiments, a fluid line is configured to be fluidly connected to a flow outlet and a faucet spout. In some embodiments, an activator device is configured to be in electrical communication with a controller. In some embodiments, a controller is configured to be in electrical communication with an electromechanical flow control valve. In some embodiments, an activator device is configured to control an electromechanical flow control valve between the opened state and a closed state. In some embodiments, when a first manual flow control valve is in an opened state, a faucet assembly is configured to deliver water from a cold water source to a first manual flow control valve, a first of a plurality of flow inlets, a flow outlet, a fluid line, and a faucet spout. In some embodiments, when a second manual flow control valve is in an opened state, a faucet assembly is configured to deliver water from a hot water source to a second manual flow control valve, a second of a plurality of flow inlets, a flow outlet, a fluid line, and a faucet spout. In some embodiments, when an electromechanical flow control valve is in an opened state, a faucet assembly is configured to deliver water from a cold water source to a manifold, a first of a plurality of flow inlets, a flow outlet, a fluid line, and a faucet spout.

In some embodiments, a faucet assembly includes a temperature control assembly configured to be fluidly connected to a cold water source, a hot water source, and a third of a plurality of flow inlets. In some embodiments, a temperature control assembly is disposed in a location configured to receive water from a cold water source and water from a hot water source. In some embodiments, a temperature control assembly is configured to provide a mixture of water from a cold water source and water from a hot water source to a third of a plurality of flow inlets.

In some embodiments, a temperature control assembly includes an off position. In some embodiments, when a temperature control assembly is in an off position, an electromechanical flow control valve is disabled.

In some embodiments, a temperature control assembly is configured to control a temperature of water in an automatic mode. In some embodiments, an activator device is disposed in and/or on the faucet body. In some embodiments, an electromechanical flow control valve may be a solenoid valve.

In some embodiments, a controller is configured to be electrically connected with a power source. In some embodiments, a power source may be a battery. In some embodiments, to power source may be an alternating current (AC) power source.

In some embodiments, an activator device is configured to be in wireless communication with a controller. In some embodiments, an activator device is configured to be in wired communication with a controller.

In some embodiments, a controller is configured to be in wireless communication with an electromechanical flow control valve. In some embodiments, a controller is configured to be in wired communication with an electromechanical flow control valve.

In some embodiments, an activator device may be a sensor. In some embodiments, an activator device may be a sensor configured to detect motion, presence of an object, absence of an object, sound, temperature changes, light, electromagnetic fields, alterations in reflected energy, or any combination thereof. In some embodiments, an activator device may be an active infrared (IR) sensor, a capacitance detection sensor, an optical detection sensor, a thermal detection sensor, or any combination thereof. In some embodiments, an activator device may include a plurality of sensors. In some embodiments, an activator device may include a microphone to enable a faucet assembly to be voice-activated.

In some embodiments, a first manual flow control valve and/or a second manual flow control valve may be a mechanical flow control valve. In some embodiments, a first manual flow control valve and/or a second manual flow control valve may comprise a switch configured to be in electrical communication with a controller. In some embodiments, in response to a first manual flow control valve and/or a second manual flow control valve being in an open position, a switch is configured to break electrical communication with a controller. In some embodiments, in response to a break in electrical communication with a controller, an electromechanical flow control valve may be disabled and set to the closed state. Upon a handle being restored to a closed position, a circuit is closed to re-enable the automatic mode.

In some embodiments, a switch associated with a manual flow control valve may be in electrical communication with an electromechanical valve and/or an actuator device. Upon rotation of a handle associated with a manual flow control valve, a circuit associated with a switch may be broken, thereby disabling an electromechanical valve and/or an actuator device, and thereby disabling an automatic mode (without any signal or instruction from a controller). Upon a handle being restored to a closed position, a circuit is closed to re-enable the automatic mode.

In some embodiments, when a first manual flow control valve and/or a second manual flow control valve are in an opened state, a faucet assembly is in a mechanical manual mode. In some embodiments, when an electromechanical flow control valve is in an opened state, a faucet assembly is in an automatic mode. A faucet assembly manual mode and automatic mode may be independently operated.

In some embodiments, a faucet assembly includes a faucet body having a faucet spout. In some embodiments, a first manual flow control valve includes an opened state and a closed state and is configured to be fluidly connected to a cold water source. In some embodiments, a second manual flow control valve includes an opened state and a closed state and is configured to be fluidly connected to a hot water source. In some embodiments, an electromechanical flow control valve includes an opened state and a closed state. In some embodiments, a flow director includes a plurality of flow inlets. In some embodiments, a first of a plurality of flow inlets is configured to be fluidly connected to a first manual flow control valve. In some embodiments, a second of a plurality of flow inlets is configured to be fluidly connected to a second manual flow control valve. In some embodiments, a third of a plurality of flow inlets is configured to be fluidly connected to an electromechanical flow control valve and is configured to be fluidly connected to a cold water source. In some embodiments, a flow director includes a flow outlet. In some embodiments, a fluid line is configured to be fluidly connected to a flow outlet and a faucet spout. In some embodiments, an activator device is configured to be in electrical communication with a controller. In some embodiments, a controller is configured to be in electrical communication with an electromechanical flow control valve and is configured to control an electromechanical flow control valve between an opened state and a closed state. In some embodiments, when a first manual flow control valve is in an opened state, a faucet assembly is configured to deliver water from a cold water source to a first manual flow control valve, a first of a plurality of flow inlets, a flow outlet, a fluid line, and a faucet spout. In some embodiments, when a second manual flow control valve is in an opened state, a faucet assembly is configured to deliver water from a hot water source to a second manual flow control valve, a second of a plurality of flow inlets, a flow outlet, a fluid line, and a faucet spout. In some embodiments, when an electromechanical flow control valve is in an opened state, a faucet assembly is configured to deliver water from a cold water source to a third of a plurality of flow inlets, a flow outlet, a fluid line, and a faucet spout. In some embodiments, a faucet assembly includes a temperature control assembly fluidly connected to a cold water source and a hot water source, and a third of a plurality of flow inlets. In some embodiments, a temperature control assembly is disposed in a location configured to receive water from a cold water source, and water from a hot water source. In some embodiments, a temperature control assembly is configured to provide a hot/cold water mixture from a cold water source and a hot water source to a third of a plurality of flow inlets.

Some embodiments of this disclosure are directed to faucet assemblies capable of operating in different modes, including a hands-free (automatic) mode and a manual (standard) mode. Multiple modes can, for example, allow a user to automatically turn on water from a faucet assembly without touching the faucet assembly or, alternatively, to turn one or more handles to turn on water and control a temperature and flowrate of the water.

In some embodiments, a faucet assembly includes an activator device in electrical communication with an electromechanical flow control valve. In some embodiments, an activator device, or electronic activator device, is present in and/or on a faucet body. Electrical communication may be via a wire (e.g., electric cable) connected to an activator device and an electromechanical flow control valve. In some embodiments, a wire may also be connected to a power source such as a battery. In some embodiments, electrical communication may be wireless. Examples of suitable wireless communication include, but are not limited to, Wi-Fi, near field communication, Bluetooth®, ZigBee, any combination thereof, or the like.

In some embodiments, an activator device may be present on a front, back, or side of a faucet body. In some embodiments, an activator device may be present on and/or in a handle body faucet assembly. In some embodiments, an activator device may be separate from a faucet body and a faucet assembly.

In some embodiments, a faucet assembly may include one or more indicator lights configured to display a status of the water (e.g., a temperature or the like) or a status of a power source (e.g., a battery, an alternating current (AC) source, or any combination thereof).

An indicator light may be configured to provide light of different colors (e.g. white, blue, green, red, orange, etc.) indicative of a water temperature, indicative of a power source being good or no-good and requiring replacing—or indicating that a battery has a certain expected life remaining, for example 180 days, 150 days, 120 days, 90 days, 60 days, 45 days, 30 days, 15 days, 10 days, or 5 days.

In some embodiments, a faucet assembly in use may be positioned on a deck (e.g., a countertop).

Following are some non-limiting embodiments of the disclosure.

In a first embodiment, disclosed is a faucet assembly comprising a faucet body; a faucet spout; a first manual flow control valve; a second manual flow control valve; an electromechanical valve; a flow director; a controller; and an activator device, wherein the first manual flow control valve is configured to be fluidly connected to a cold water source and the flow director, and to deliver cold water to the faucet spout, the second flow control valve is configured to be fluidly connected to a hot water source and the flow director, and to deliver hot water to the faucet spout, the electromechanical valve is configured to be fluidly connected to a cold water source and the flow director, the electromechanical valve, the controller, and the activator device are configured to be in electrical communication, and the controller is configured to receive a signal from the activator device indicating it has been activated, and to send a signal to the electromechanical valve to open to deliver cold water to the faucet spout.

In a second embodiment, disclosed is a faucet assembly according to the first embodiment, wherein the faucet assembly is configured to be independently operated in a manual mode via operation the first and/or second manual flow control valves, and to be independently operated in an automatic mode via operation of the electromechanical valve. In a third embodiment, disclosed is a faucet assembly according to the second embodiment, wherein the faucet assembly is configured such that the automatic mode is disabled upon operation of the first and/or second manual flow control valves.

In a fourth embodiment, disclosed is a faucet assembly according to the third embodiment, comprising an override assembly associated with the first and/or second manual flow control valves, wherein the override assembly is in electrical communication with the controller, upon operation of the first and/or second manual flow control valves, the override assembly is configured to communicate the manual valve operation to the controller, and the controller is configured to disable the electromechanical valve and/or the activator device upon receiving the communication from the override assembly, or the override assembly is in electrical communication with the electromechanical valve and/or with the activator device, upon operation of the first and/or second manual flow control valves, the override assembly is configured to disable the electromechanical valve and/or the activator device.

In a fifth embodiment, disclosed is a faucet assembly according to the fourth embodiment, wherein the override assembly comprises a flow sensor in electrical communication with the controller, upon operation of the first and/or second manual flow control valves, the flow sensor is configured to detect water flow from the first and/or second manual flow control valves, and to communicate the water flow to the controller, and the controller is configured to disable the electromechanical valve upon receiving the communication from the flow sensor.

In a sixth embodiment, disclosed is a faucet assembly according to the fourth embodiment, wherein the override assembly comprises an electric switch in electrical communication with the controller, upon operation of the first and/or second manual flow control valves, the electric switch is configured to detect movement of a faucet handle associated with the first and second manual flow control valves, and to communicate the faucet handle movement to the controller, and the controller is configured to disable the electromechanical valve upon receiving the communication from the switch.

In a seventh embodiment, disclosed is a faucet assembly according to the fourth embodiment, wherein the override assembly comprises an electric switch in electrical communication with the electromechanical valve and/or the activator device, upon operation of the first and/or second manual flow control valves, the electric switch is configured to break a circuit, and the electromechanical valve and/or the activator are disabled upon breaking the circuit.

In an eighth embodiment, disclosed is a faucet assembly according to any of the preceding embodiments, comprising a temperature control assembly comprising a temperature adjuster, wherein the temperature control assembly is configured to be fluidly connected to a cold water source and to a hot water source, the temperature control assembly is fluidly connected to the electromechanical valve, the electromechanical valve is configured to deliver a hot/cold water mixture to the faucet spout, and the temperature adjuster is configured to adjust a ratio of hot water and cold water in the hot/cold water mixture.

In a ninth embodiment, disclosed is a faucet assembly according to embodiment 8, wherein the temperature control assembly is configured to be positioned upstream from the electromechanical valve. In a tenth embodiment, disclosed is a faucet assembly according to embodiments 8 or 9, wherein the temperature adjuster is configured to be set manually. In an eleventh embodiment, disclosed is a faucet assembly according to any of embodiments 8 to 10, wherein the temperature adjuster comprises an off position, wherein an automatic mode is disabled. In an embodiment, a temperature adjuster comprises a rotatable lever, a rotatable dial, or a rotatable knob.

In a twelfth embodiment, disclosed is a faucet assembly according to any of the preceding embodiments, wherein the activator device is positioned on or in the faucet body. In a thirteenth embodiment, disclosed is a faucet assembly according to any of the preceding embodiments, wherein the activator device is configured to be in wired or wireless electronic communication with the controller.

In a fourteenth embodiment, disclosed is a faucet assembly according to any of the preceding embodiments, wherein the controller is configured to be in wired or wireless electronic communication with the electromechanical valve.

In a fifteenth embodiment, disclosed is a faucet assembly according to any of the preceding embodiments, wherein the activator device comprises one or more of a motion sensor, a presence sensor, or a microphone. In a sixteenth embodiment, disclosed is a faucet assembly according to any of the preceding embodiments, wherein the activator device comprises one or more of an infrared sensor, a capacitive sensor, an optical sensor, or a thermal detection sensor.

In a seventeenth embodiment, disclosed is a faucet assembly according to any of the preceding embodiments, wherein the flow director is configured to be downstream of the electromechanical valve.

In an eighteenth embodiment, disclosed is a faucet assembly according to any of the preceding embodiments, wherein the faucet assembly is configured to be positioned on a deck, and wherein the flow director is configured to be positioned below the deck. In a nineteenth embodiment, disclosed is a faucet assembly according to embodiment 18, wherein the electromechanical valve is configured to be positioned below the deck. In a twentieth embodiment, disclosed is a faucet assembly according to embodiments 18 or 19, comprising a housing configured to be positioned below the deck, wherein one or more of the controller, the electromechanical valve, or the flow director are disposed within the housing. In a twenty-first embodiment, disclosed is a faucet assembly according to embodiment 20, wherein a temperature control assembly is at least partially disposed within the housing. In a twenty-second embodiment, disclosed is a faucet assembly according to embodiment 21, wherein a temperature adjuster is configured to protrude from the housing and to be manipulated from a housing exterior.

In a twenty-third embodiment, disclosed is a faucet assembly according to any of the preceding embodiments, comprising a manifold. In a twenty-fourth embodiment, disclosed is a faucet assembly according to embodiment 23, wherein the manifold is configured to be positioned below a deck. In a twenty-fifth embodiment, disclosed is a faucet assembly according to embodiments 23 or 24, wherein the electromechanical valve is coupled to the manifold, and wherein the manifold is configured to deliver cold water to the faucet spout in an automatic mode.

In a twenty-sixth embodiment, disclosed is a faucet assembly according to any of embodiments 1 to 22, wherein the flow director and the electromechanical valve are independently coupled to a manifold and positioned upstream of the manifold. In a twenty-seventh embodiment, disclosed is a faucet assembly according to embodiment 26, wherein the manifold comprises a flow sensor fluidly connected to the first and/or second manual flow control valves. In a twenty-eighth embodiment, disclosed is a faucet assembly according to embodiments 26 or 27, comprising a temperature control assembly positioned upstream of the electromechanical valve.

When elements are configured to receive from or configured to deliver to or provide fluid to another element, or when elements are coupled to other elements regarding fluid flow, the elements are in fluid communication or fluidly coupled with each other.

The terms "coupled" or "connected" may mean that an element is "attached to" or "associated with" another element. Coupled or connected may mean directly coupled or coupled through one or more other elements. An element may be coupled to an element through two or more other elements in a sequential manner or a non-sequential manner. The term "via" in reference to "via an element" may mean "through" or "by" an element. Coupled or connected or "associated with" may also mean elements not directly or indirectly attached, but that they "go together" in that one may function together with the other.

The term "towards" in reference to a of point of attachment, may mean at exactly that location or point or, alternatively, may mean closer to that point than to another distinct point, for example "towards a center" means closer to a center than to an edge.

The term "like" means similar and not necessarily exactly like. For instance "ring-like" means generally shaped like a ring, but not necessarily perfectly circular.

The articles "a" and "an" herein refer to one or to more than one (e.g. at least one) of the grammatical object. Any ranges cited herein are inclusive.

Features described in connection with one embodiment of the disclosure may be used in conjunction with other embodiments, even if not explicitly stated.

Embodiments of the disclosure include any and all parts and/or portions of the embodiments, claims, description and figures. Embodiments of the disclosure also include any and all combinations and/or sub-combinations of embodiments.

The invention claimed is:

1. A faucet assembly comprising
a faucet body;
a faucet spout;
a first manual flow control valve;
a second manual flow control valve;
an electromechanical valve;
a flow director;
a controller; and
an activator device,
wherein
the first manual flow control valve is configured to be fluidly connected to a cold water source and the flow director, and to deliver cold water to the faucet spout,
the second flow control valve is configured to be fluidly connected to a hot water source and the flow director, and to deliver hot water to the faucet spout,
the electromechanical valve is configured to be fluidly connected to the cold water source and the flow director,
the flow director is positioned downstream of the electromechanical valve,
the electromechanical valve, the controller, and the activator device are configured to be in electrical communication, and
the controller is configured to receive a signal from the activator device indicating it has been activated, and to send a signal to the electromechanical valve to open to deliver cold water to the faucet spout, and
wherein
the faucet assembly is configured to be independently operated in a manual mode via operation of the first and/or second manual flow control valves, and to be independently operated in an automatic mode via operation of the electromechanical valve.

2. The faucet assembly according to claim 1, wherein the faucet assembly is configured such that the automatic mode is disabled upon manual operation of the first and/or second manual flow control valves.

3. The faucet assembly according to claim 2, comprising an override assembly associated with the first and/or second manual flow control valves,
wherein
the override assembly is in electrical communication with the controller, upon operation of the first and/or second manual flow control valves, the override assembly is configured to communicate the manual valve operation to the controller, and the controller is configured to disable the electromechanical valve and/or the activator device upon receiving the communication from the override assembly, or the override assembly is in electrical communication with the electromechanical valve and/or with the activator device, and upon operation of the first and/or second manual flow control valves, the override assembly is configured to disable the electromechanical valve and/or the activator device.

4. The faucet assembly according to claim 3, wherein
the override assembly comprises a flow sensor in electrical communication with the controller, upon operation of the first and/or second manual flow control valves, the flow sensor is configured to detect water flow from the first and/or second manual flow control valves, and to communicate the water flow to the controller, and the controller is configured to disable the electromechanical valve upon receiving the communication from the flow sensor.

5. The faucet assembly according to claim 3, wherein
the override assembly comprises an electric switch in electrical communication with the controller, upon operation of the first and/or second manual flow control valves, the electric switch is configured to detect movement of a faucet handle associated with the first and second manual flow control valves, and to communicate the faucet handle movement to the controller, and the controller is configured to disable the electromechanical valve upon receiving the communication from the switch.

6. The faucet assembly according to claim 3, wherein
the override assembly comprises an electric switch in electrical communication with the electromechanical valve and/or the activator device, upon operation of the first and/or second manual flow control valves, the electric switch is configured to break a circuit, and the electromechanical valve and/or the activator are disabled upon breaking the circuit.

7. The faucet assembly according to claim 1, comprising a temperature control assembly comprising a temperature adjuster,
wherein
the temperature control assembly is configured to be fluidly connected to the cold water source and to the hot water source,
the temperature control assembly is fluidly connected to the electromechanical valve,
the electromechanical valve is configured to deliver a hot/cold water mixture to the faucet spout, and
the temperature adjuster is configured to adjust a ratio of hot water and cold water in the hot/cold water mixture.

8. The faucet assembly according to claim 7, wherein
the temperature control assembly is configured to be positioned upstream from the electromechanical valve,
the temperature adjuster is configured to be set manually, and
the temperature adjuster comprises an off position, wherein when in the off position, the automatic mode is disabled.

9. The faucet assembly according to claim 1, wherein the activator device comprises one or more of a motion sensor, a presence sensor, or a microphone.

10. The faucet assembly according to claim 1, wherein the faucet assembly is configured to be positioned on a deck, and wherein the flow director and the electromechanical valve are configured to be positioned below the deck.

11. The faucet assembly according to claim 1, comprising a housing, wherein one or more of the controller, the electromechanical valve, or the flow director are disposed within the housing.

12. The faucet assembly according to claim 11, comprising a temperature control assembly, wherein the temperature control assembly is at least partially disposed within the housing and configured to protrude from the housing so as to be manipulated from a housing exterior.

13. The faucet assembly according to claim 1, comprising a manifold, wherein the electromechanical valve is coupled to the manifold, and the manifold is configured to deliver cold water to the faucet spout in the automatic mode.

14. A faucet assembly comprising
a faucet body;
a faucet spout;
a first manual flow control valve;
a second manual flow control valve;
an electromechanical valve;
a flow director;
a manifold;
a controller; and
an activator device,
wherein
the first manual flow control valve is configured to be fluidly connected to a cold water source and the flow director, and to deliver cold water to the faucet spout,
the second flow control valve is configured to be fluidly connected to a hot water source and the flow director, and to deliver hot water to the faucet spout,
the electromechanical valve is configured to be fluidly connected to the cold water source and the flow director,
the electromechanical valve, the controller, and the activator device are configured to be in electrical communication, and
the controller is configured to receive a signal from the activator device indicating it has been activated, and to send a signal to the electromechanical valve to open to deliver cold water to the faucet spout,
the faucet assembly is configured to be independently operated in a manual mode via operation of the first and/or second manual flow control valves, and to be independently operated in an automatic mode via operation of the electromechanical valve, and
the flow director and the electromechanical valve are fluidly coupled to the manifold and positioned upstream of the manifold.

15. The faucet assembly according to claim 14, wherein the faucet assembly is configured such that the automatic mode is disabled upon manual operation of the first and/or second manual flow control valves.

16. The faucet assembly according to claim 14, wherein
the manifold comprises a flow sensor fluidly connected to the first and/or second manual flow control valves,
upon operation of the first and/or second manual flow control valves, the flow sensor is configured to detect water flow from the first and/or second manual flow control valves, and to communicate the water flow to the controller, and the controller is configured to disable the electromechanical valve upon receiving the communication from the flow sensor.

17. The faucet assembly according to claim 14, wherein the assembly comprises an electric switch in electrical communication with the controller,
upon operation of the first and/or second manual flow control valves, the electric switch is configured to detect movement of a faucet handle associated with the first and second manual flow control valves, and to communicate the faucet handle movement to the controller, and
the controller is configured to disable the electromechanical valve upon receiving the communication from the switch.

18. The faucet assembly according to claim 14, wherein the assembly comprises an electric switch in electrical communication with the electromechanical valve and/or the activator device,
upon operation of the first and/or second manual flow control valves, the electric switch is configured to break a circuit, and
the electromechanical valve and/or the activator are disabled upon breaking the circuit.

19. The faucet assembly according to claim 14, comprising a temperature control assembly positioned upstream of the electromechanical valve, and wherein the electromechanical valve is configured to deliver a hot/cold water mixture to the faucet spout.

20. The faucet assembly according to claim 19, wherein the temperature control assembly comprises a temperature adjuster configured to adjust a ratio of hot water and cold water in the hot/cold water mixture, and wherein the temperature adjuster comprises an off position, and when in the temperature adjuster off position, the automatic mode is disabled.

* * * * *